W. SHOMER.
HORSESHOE.
APPLICATION FILED MAY 16, 1916.
1,198,672.
Patented Sept. 19, 1916.
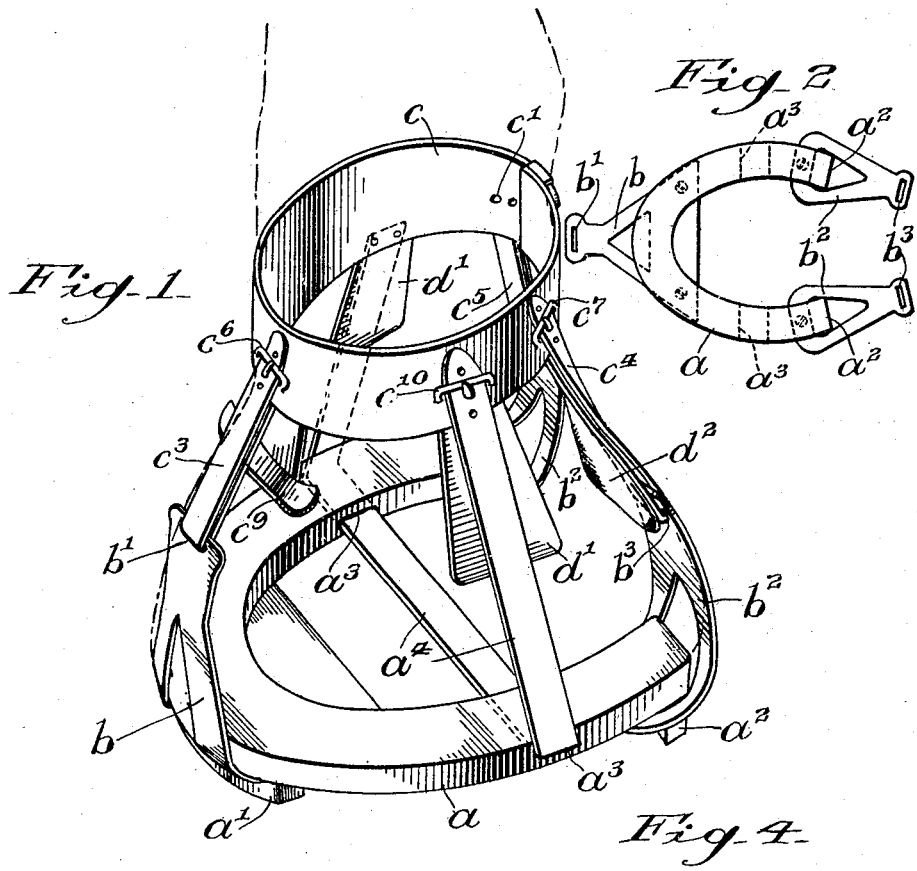
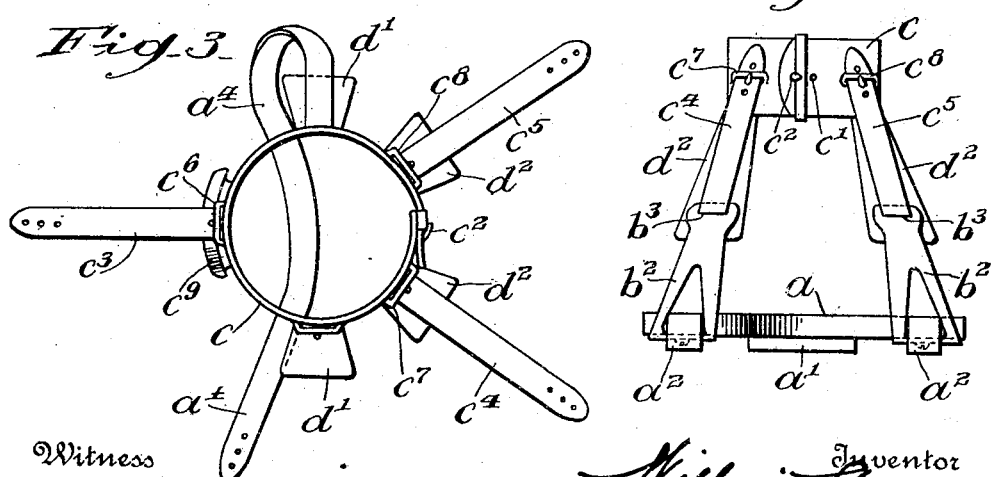

UNITED STATES PATENT OFFICE.

WILLIAM SHOMER, OF PHILADELPHIA, PENNSYLVANIA.

HORSESHOE.

1,198,672. Specification of Letters Patent. Patented Sept. 19, 1916.

Application filed May 16, 1916. Serial No. 97,779.

*To all whom it may concern:*

Be it known that I, WILLIAM SHOMER, a citizen of the United States, residing at the city of Philadelphia, in the county of Philadelphia and State of Pennsylvania, have invented certain new and useful Improvements in Horseshoes, of which the following is a specification.

My invention has relation to a type of shoe applicable to the hoof of a horse or other animal in which nails are not employed for securing the shoe to the hoof.

The principal objects of my invention are first, to provide a shoe for an animal having front and rear straps and having an ankle encircling collar provided with a harness arranged to detachably engage the shoe straps and the collar having a side strap as part of the same to encircle the body of the shoe about midway in the length of the same to afford greater security in application of the shoe to the hoof against lateral and other movement while supported in operative position in connection with the animal's hoof; and second to provide an animal shoe that by release of a series of straps connected with a readily detachable ankle collar, permits of the quick removal of the shoe from the animal, as at night while the animal is resting so as to afford greater comfort to the animal as well as to obviate diseasing the hoof through careless driving of nails into the same, which is of common occurrence.

The nature and scope of my present invention will be more fully understood from the following description taken in connection with the accompanying drawings forming part thereof, in which—

Figure 1 is a perspective view of a shoe embodying the salient features of my invention. Fig. 2 is a top or plan view of the shoe provided with toe and heel straps detached from the ankle collar having a harness adapted to engage the shoe straps. Fig. 3 is a plan view of the ankle collar with its harness; and Fig. 4 is a rear view of the shoe and ankle collar, showing the rear harness to engage complemental shoe straps therewith.

Referring to the drawings, $a$ is the animal shoe provided with toe and heel calks $a^1$ and $a^2$, $a^2$, and which as shown, are formed integral with the shoe, but they may be arranged to be respectively, removable from the shoe. The body of the shoe about midway in the length thereof is slotted at $a^3$, $a^3$, as clearly shown in Fig. 1, for a purpose to be presently fully explained.

Embracing the toe calk $a^1$, of the shoe is a strap $b$, with an upper loop $b^1$, therein and the heel calks $a^2$, $a^2$, are provided with complemental straps $b^2$, $b^2$, having loops $b^3$, $b^3$, therein. An ankle collar $c$, is provided with means for buckling or clipping as at $c^1$ and $c^2$, to the animal's leg as clearly shown in Figs. 1 and 4. This collar is provided with depending front and rear strap $c^3$ and $c^4$, $c^5$, arranged to engage the loops of the respective shoe straps $b$ and $b^2$, $b^2$, as clearly shown in Fig. 1, and buckles $c^6$, and $c^7$, $c^8$, of the collar $c$, for safely securing and thereby firmly supporting the shoe in required position against the animal's hoof as will be clearly understood from Figs. 1 and 4. The collar $c$, is provided with depending chafe-resisting pieces $d^1$ and $d^2$, $d^2$, about where the straps of the collar engage the straps of the shoe $a$, to afford greater comfort to the animal in application and for the tightening of the collar straps to the shoe straps, which must be done to obtain a firm contact position of the shoe with the animal's hoof in the use of such type of shoe wholly unnailed to the hoof. The front portion of the collar is provided with a centrally located depending brace $c^9$, arranged to engage the hoof to readily position the shoe thereto. The collar $c$, also is provided with a strap $a^4$, extending through the shoe slots $a^3$, $a^3$ and buckled at $c^{10}$, then to the said collar, for tightly securing the shoe to the hoof. This type of shoe is particularly applicable to animals with tender or soft hoofs, because preventing their becoming ragged or broken about the periphery as now is very often the case through the careless driving of nails into the hoof. Furthermore, such type of shoe is particularly desirable for application to high class animals, as it affords an opportunity to remove expeditiously the shoes at night and while the animal is resting or sleeping. It also enables the hoof to be kept in a more cleanly condition, due to the facility with which the shoe may be removed.

Having thus described the nature and objects of my invention, which I claim as new and desire to secure by Letters Patent is:—

1. An animal shoe having front and rear straps provided with loops and an ankle collar having straps to enter the respective shoe-strap loops and buckling with said collar, the latter provided with a side strap arranged to enter the body of the shoe and taken up in a connection of said collar, the arrangement of said straps being such that the shoe from different points is securely fastened in contact with the animal hoof.

2. An animal shoe having front and rear straps provided with loops and an ankle collar having straps arranged to enter the respective shoe-strap loops and buckling with said collar, the latter provided with side straps and taken up in a connection of said collar, said strap arrangement being such as to securely fasten the shoe from different points in contact with the hoof and said collar provided with a brace to position the same in respect to said hoof.

3. An animal shoe having front and rear straps provided with loops and an ankle collar arranged to enter the respective shoe-strap loops and buckling with said collar, the latter provided with a side strap arranged to enter the body of the shoe and taken up in a connection of said collar, and front and rear non-chafing pads located about said collar straps, substantially as and for the purposes described.

In witness whereof, I have hereunto set my signature in the presence of two subscribed witnesses.

WILLIAM SHOMER.

Witnesses:
J. WALTER DOUGLASS,
THEODORE ROSEMANN.

Copies of this patent may be obtained for five cents each, by addressing the "Commissioner of Patents. Washington, D. C."